(12) United States Patent
Hillel et al.

(10) Patent No.: US 10,078,653 B2
(45) Date of Patent: Sep. 18, 2018

(54) AUTOMATIC LOCK REMOVAL METHOD FOR SCALABLE SYNCHRONIZATION IN DYNAMIC DATA STRUCTURES

(71) Applicant: Yahoo! Inc., Sunnyvale, CA (US)

(72) Inventors: Eshcar Hillel, Binyamina (IL); Maya Arbel, Haifa (IL); Guy Gueta, Holon (IL); Idit Keidar, Haifa (IL)

(73) Assignee: Oath Inc., New York, NY (US)

( * ) Notice: Subject to any disclaimer, the term of this patent is extended or adjusted under 35 U.S.C. 154(b) by 470 days.

(21) Appl. No.: 14/741,247

(22) Filed: Jun. 16, 2015

(65) Prior Publication Data

US 2016/0371318 A1    Dec. 22, 2016

(51) Int. Cl.
*G06F 17/30* (2006.01)
*G06F 8/71* (2018.01)

(52) U.S. Cl.
CPC .......... *G06F 17/30362* (2013.01); *G06F 8/71* (2013.01); *G06F 17/30371* (2013.01)

(58) Field of Classification Search
USPC ......................................................... 707/704
See application file for complete search history.

(56) References Cited

U.S. PATENT DOCUMENTS

| 7,941,799 B2* | 5/2011 | Easton | G06F 12/109 |
| | | | 718/1 |
| 2003/0097396 A1* | 5/2003 | Zhang | G06F 9/52 |
| | | | 718/104 |
| 2008/0077591 A1* | 3/2008 | Gupta | G06F 9/466 |
| 2009/0064094 A1* | 3/2009 | Burka | G06F 9/528 |
| | | | 717/106 |
| 2014/0059333 A1* | 2/2014 | Dixon | G06F 9/3004 |
| | | | 712/244 |

(Continued)

OTHER PUBLICATIONS

"Class ConcurrentSkipListMap" from java.util.comcurrent © 1993 Oracle, downloaded from docs.oracle.com/javase/7/docs/api/java/util/concurrent/ConcurrentSkipListMap.html.

(Continued)

*Primary Examiner* — Cam-Linh Nguyen
(74) *Attorney, Agent, or Firm* — Weaver Austin Villeneuve & Sampson LLP

(57) ABSTRACT

In one embodiment, a set of lock and unlock instructions in a read phase of a computer-readable program is replaced with a first set of tracking instructions, wherein the first set of tracking instructions track a set of locked objects identifying objects that would have been locked by executing the set of lock and unlock instructions. A second set of tracking instructions is inserted into the read phase of the computer-readable program, wherein the second set of tracking instructions track a set of read objects indicating versions of objects that are read. Validation instructions are inserted into the computer-readable program, wherein the validation instructions validate that the versions of objects in the set of read objects have not changed since they were last read and lock the set of locked objects that would have been locked upon completing execution of the set of lock and unlock instructions. Update instructions are added to an update phase of the computer-readable program, where the update instructions increment a current version of an object each time a value of the object is updated or a lock of the object is released.

21 Claims, 8 Drawing Sheets

(56) References Cited

U.S. PATENT DOCUMENTS

| | | | | |
|---|---|---|---|---|
| 2014/0089271 A1* | 3/2014 | Al-Otoom | ............... | G06F 9/44 707/690 |
| 2015/0032998 A1* | 1/2015 | Rajwar | ............... | G06F 9/30145 712/208 |
| 2015/0220372 A1* | 8/2015 | Ban | .......................... | G06F 9/52 710/200 |

OTHER PUBLICATIONS

Ghemawat, Sanjay, "A fast and lightweight key/value database library by google.\," Dec. 11, 2014, downloaded from http://code.google.com/p/leveldb.

Jmonkeyengine, "In the age of free AAA game engines, are we still relevant?" Mar. 8, 2015, downloaded from http://jmonkeyengine.org/.

Afek, Y. et al., "Atomic snapshots of shared memory," J. ACM 40(4):873-890, Sep. 1993.

Afek, Y. et al., "CBTree: A practical concurrent self-adjusting search tree," Disc, pp. 1-15, 2012.

Afek, Y. et al., "Software-improved hardware lock elision," PODC'14, Jul. 15-18, 2014.

Aragon, Cecilia R. et al., "Randomized search frees," FOCS, pp. 540-545, 1989.

Arbel, Maya et al., "Concurrent updates with RCU: search tree as an example," PODC'14, Jul. 15-18, 2014.

Braginsky, Anastasia et al., "A lock-free B+ tree," SPAA, pp. 58-67, 2012.

Bronson, Nathan G. et al., "A practical concurrent binary search tree," PPoPP'10: proceedings of the $15^{th}$ ACM SIGPLAN symposium on principals and practice of parallel programming, Jan. 2010.

Brown, T. et al., "A general technique for non-blocking trees," PPoPP'14, Feb. 15-19, 2014.

Brown, T. et al., "Range queries in non-blocking k-ary search trees," OPODIS, pp. 31-45, 2012.

Cascaval, C. et al., "Software transactional memory: why is it only a research toy?" Queue, 6(5):46-58, Sep. 2008.

Cherem, Sigmund et al., "Inferring locks for atomic sections," PLDI, 2008.

Crain, T. et al., "The contention-friendly tree," $19^{th}$ international conference on parallel processing (Euro-Par), pp. 229-240, 2013.

Cunningham, D. et al., "Keep off the grass: locking the right path for atomicity," CC, pp. 276-290, 2008.

Dean, Jeff et al., "Leveldb," Dec. 11, 2014, downloaded from http://htmlpreview.github.io/?https://github.com/google/leveldb/blob/mas . . . .

Dice, Dave et al., "Transactional locking II," DISC, pp. 194-208, 2006.

Doherty, Simon et al., "DCAS is not a silver bullet for nonblocking algorithm design," SPAA'04, Jun. 27-30, 2004.

Drachsler, Dana et al., "Practical concurrent binary search trees via logical ordering," PPoPP'14, Feb. 15-19, 2014.

Duffy, J., "A (brief) retrospective on transactional memory," Jan. 3, 2010.

Ellen, Faith et al. "Non-blocking binary search trees," PODC'10, Jul. 25-28, 2010.

Emmi, M. et al, "Lock allocation," POPL, pp. 291-296, 2007.

Ferro, Daniel et al., "Lock-free transactional support for distributed data stores," ICDE, pp. 676-687, 2014.

Fraser, K., "Practical lock-freedom," Technical Report No. 579, PhD thesis, University of Cambridge, 2004.

Golan-Gueta, Guy et al., "Automatic fine-grain locking using shape properties," OOPSLA'11, Oct. 22-27, 2011.

Gramoli, V., "More than you ever wanted to know about synchronization, Synchrobench, measuring the impact of the synchronization on concurrent algorithms," PPoPP, Feb. 8, 2015.

Gudka, K. et al., "Lock inference in the presence of large libraries," ECOOP 2012.

Guerraoui, R. et al., "On the correctness of transactional memory," PPoPP'08, Feb. 20-23, 2008/.

Harris, T. et al., "Synthesis Lectures on computer architecture," Transactional Memory, $2^{nd}$ Edition, 2010.

Herlihy, M. et al., "The art of multiprocessor programming," 2008.

Herlihy, M. et al., "A simple optimistic skip-list algorithm," $14^{th}$ international conference on structural information and communication complexity (SIROCCO), pp. 124-138, 2007.

Hicks, M. et al., "Lock inference for atomic sections," Proceedings of the first ACM SIGPLAN workshop on languages, compilers, and hardware support for transactional computing, Jun. 2006.

Israeli, A. et al., "Disjoint-access-parallel implementations of strong shared memory primitives," Proceedings of the $13^{th}$ annual ACM symposium on principles of distributed computing, 1994, abstract.

Jin, G. et al., "Automated concurrency-bug fixing," OSDI, 2012.

Korland, G. et al., "Noninvasive concurrency with Java STM," MULTIPROG, 2010.

Lev-Ari, K. et al., "On correctness of data structures under reads-write concurrency," DISC, Oct. 2014.

McCloskey, B. et al., "Autolocker: synchronization inference for atomic sections," POPL'06, Jan. 11-13, 2006.

McKenney, P.E. et al., "Is parallel programming hard, and, if so, what can you do about it?" Linux Technology Center, IBM Beaverton, Mar. 10, 2014.

Michael, M.M. et al., "Simple, fast, and practical non-blocking and blocking concurrent queue algorithms," PODC, 1996.

Nakaike, T. et al., "Lock elision for read-only critical sections in java," PLDI, Jun. 2010, abstract.

Natarajan, A. et al., "Fast concurrent lock-free binary search trees," Proceedings of the $19^{th}$ ACM SIGPLAN symposium on principles and practice of parallel programming, 2014, abstract.

Rajwar, R. et al., "Transactional lock-free execution of lock-based programs," Proceedings of the $10^{th}$ international conference on architectural support for programming languages and operating systems (ASPLOS), Oct. 6-9, 2002.

Roy, A. et al., "A runtime system for software lock elision," EuroSys'09, Apr. 1-3, 2009.

Shacham, O. et al., "Testing atomicity of composed concurrent operations," OOPSLA'11, Oct. 22-27, 2011.

Shacham, O. et al., "Verifying atomicity via data independence," ISSTA'14, Jul. 21-25, 2014.

Shalev, O. et al., "Predictive log-synchronization," EuroSys'06, Apr. 18-21, 2006.

Wikipedia, "jMonkeyEngine," downloaded from https://en.wikipedia.org/wiki/JMonkeyEngine, page last modified May 2, 2015.

Wikipedia, "LevelDB," downloaded from https://en.wikipedia.org/wiki/LevelDB, page last modified on May 18, 2015.

Zyulkyarov, F. et al., "Atomic quake: using transactional memory in an interactive multiplayer game server," PPoPP'09, Feb. 14-18, 2009.

\* cited by examiner

FIG. 2A    FIG. 2B

| Original code | Transformed Code |
|---|---|
| x.lock() | if !track(x) then goto 3 |
| x.unlock() | lockedSet.remove(x) |

FIG. 2C

```
1: FUNCTION track(obj)
2:     lockedSet.add(obj)
3:     long ver = obj.getVersion()
4:     readSet.add((obj,ver))
5:     if (obj,v) ∈readSet and v!=ver then
6:         return false
7:     if obj.isLockedByAnother() then
8:         return false
9:     return true
```

FIG. 3

```
1: FUNCTION validateReadSet()
2:     for all hobj,veri in readSet do
3:         if obj.isLockedByAnother() then
4:             return false         -> (validation failed)
5:                                  -> (locked object)
6:         if obj.getVersion() != ver then
7:             return false         -> (validation failed)
8:                                  -> (different version)
9:     return true                  -> (validation succeed)
```

FIG. 4

AUTOMATIC LOCK REMOVAL METHOD FOR SCALABLE SYNCHRONIZATION IN DYNAMIC DATA STRUCTURES

BACKGROUND OF THE INVENTION

The disclosed embodiments relate generally to computer-implemented methods and apparatus for performing automatic lock removal from source code.

Many platforms such as distributed file systems and key-value stores use concurrent data structures that may be accessed by multiple devices or threads. Traditionally, the way to implement such data structures has been to use locks. Locks are typically obtained immediately prior to access of concurrent data structures and released immediately after the access of the concurrent data structures. Such access may include writing data to the data structures, as well as reading data from the data structures.

The use of locks ensures integrity of the concurrent data structures. However, these same locks may also lead to bottlenecks. To increase the efficiency of such systems, scalable concurrent data structures may be developed. However, these data structures are time-consuming to implement and are error-prone.

SUMMARY OF THE INVENTION

The disclosed embodiments perform automated code transformation on source code. The transformation is accomplished, in part, by removing lock and corresponding unlock instructions from a portion of source code. The source code may also be referred to as a computer-readable program.

In one embodiment, a set of lock and unlock instructions is removed from a read phase of source code. Tracking instructions are inserted into the read phase of the source code, where the tracking instructions track a set of read objects indicating versions of objects that are read. Validation instructions are inserted into the source code, where the validation instructions validate that the versions of objects in the set of read objects have not changed since they were last read. Update instructions are added to an update phase of the source code, where the update instructions increment a version of an object each time a value of the object is updated or a lock of the object is released.

In another embodiment, a set of lock and unlock instructions in a read phase of a computer-readable program is replaced with a first set of tracking instructions, wherein the first set of tracking instructions track a set of locked objects identifying objects that would have been locked by executing the set of lock and unlock instructions. A second set of tracking instructions is inserted into the read phase of the computer-readable program, wherein the second set of tracking instructions track a set of read objects indicating versions of objects that are read. Validation instructions are inserted into the computer-readable program, wherein the validation instructions validate that the versions of objects in the set of read objects have not changed since they were last read and lock objects in the set of locked objects. Update instructions are added to an update phase of the computer-readable program, where the update instructions increment a current version of an object each time a value of the object is updated or a lock of the object is released.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

FIG. 2A is an example of source code on which a transformation may be implemented in accordance with various embodiments.

FIG. 2B is an example of source code that may be generated by performing transformation of the source code of FIG. 2A.

FIG. 2C is an example of computer-readable instructions that may replace lock and unlock instructions in the source code.

FIG. 3 is a diagram illustrating an example eager validation scheme that may be applied during the read-only phase of the source code.

FIG. 4 is an example of computer-readable instructions that may be used to validate that objects that have been read have not been modified in accordance with various embodiments.

DETAILED DESCRIPTION OF THE SPECIFIC EMBODIMENTS

Figure 1:
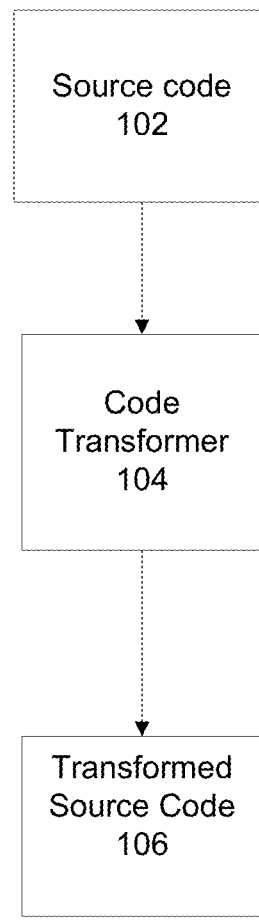
FIG. 1 is a diagram illustrating an example system in which embodiments of the invention may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Today, the number of cores per machine is rapidly increasing; multi-core hardware is also becoming commonplace in production settings in many companies. This improvement in technology has been an incentive to replace legacy sequential code with code that can exploit the full computation power offered by these high-end machines, thereby improving the scalability of large data systems.

Concurrent (i.e., shared) data structures are commonly used in many system components. For example, the index of a distributed file system is often stored in a concurrent tree data structure. However, the use of locks to ensure the integrity of the data can lead to bottlenecks during execution of the code that accesses the data structures by multiple threads. Therefore, suboptimal implementations of system components can impede the scalability of the entire system.

Bottlenecks found in legacy code can be removed by replacing the sequential code with hand-crafted off-the-shelf solutions, or by re-implementing each of the data structures. Many recent works have been dedicated to developing scalable concurrent data structures. Each of these projects generally focuses on a single data structure (e.g., a binary search tree or a queue) and manually optimizes its implementation. Proving the correctness of such custom-tailored data structures is painstaking. Furthermore, systems often use data structures in unique ways that necessitate changing or extending their code, which limits the usability of custom-tailored implementations. Hence, the return-on-investment for such endeavors may be suboptimal. Therefore, these solutions are error-prone and might not be suited for all data structures used in current systems.

While using locks with concurrent data structures guarantees the correctness of the data, such pessimistic synchronization often impedes the scalability of systems. Alternatively, optimistic concurrency control avoids locking; however, optimistic concurrency bears the overhead associated with deferring updates to the data structures or executing them speculatively.

The disclosed embodiments support the automatic instrumentation of code that includes locking instructions to support parallelization of sequential code. More particularly, a portion of the locking instructions within the code may be eliminated by relying on an optimistic traversal of the data structure while preserving the safety guarantees of the original code.

FIG. 1 is a block diagram illustrating an example system in which embodiments of the invention may be implemented. Source code 102 may be processed by a code transformer 104 to generate transformed source code 106, as will be described in further detail below. The code transformer 104 may be implemented via computer-readable instructions that may be executed to automatically transform source code without human intervention. In accordance with various embodiments, the code transformer 104 may further include one or more processors, computers, or servers configured to execute the computer-readable instructions.

In one embodiment, the code transformer 104 may be integrated with a compiler. Thus, code transformation may be performed during compile-time. In other embodiments, the code transformer 104 may be operated independently from a compiler. The code transformer 104 may perform source code transformation in response to a message received from a system component. Alternatively, the code transformer 104 may perform source code transformation in response to a message or other action initiated by a user.

In some embodiments, the code transformer 104 may be implemented by server(s) in a network. The network may take any suitable form, such as a wide area network or Internet and/or one or more local area networks (LAN's). The network may include any suitable number and type of devices, e.g., routers and switches, for forwarding requests and/or source code from each client to a web application and responses and/or transformed source code back to the requesting clients.

The disclosed embodiments may also be practiced in a wide variety of network environments including, for example, TCP/IP-based networks, telecommunications networks, wireless networks, etc. In addition, computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

In accordance with various embodiments, each operation (e.g., function) within the transformed source code performs an optimistic traversal of the concurrent data structure as long as no shared memory locations are updated, and then proceeds with pessimistic code. The disclosed embodiments may complement pessimistic transformations that make sequential code thread-safe by adding locks. Thus, such pessimistic transformations may be optimized by reducing synchronization bottlenecks.

The disclosed embodiments may be implemented with any type of data structures. For example, the data structures may include list-based data structures or tree based data structures.

As will be described in further detail below, source code that accesses concurrent data structure(s) may be automatically transformed by eliminating a portion of the locking and corresponding unlock instructions within the code. By replacing these locking steps with optimistic synchronization, contention is reduced.

In one embodiment, the automatic code instrumentation described herein may be performed by a set of computer-readable instructions executed at compile-time. Thus, the automatic code instrumentation may be implemented by a compiler or other software executed at compile-time. In other embodiments, the automatic code instrumentation may be implemented by a set of computer-readable instructions executed automatically by a system component or upon initiation by a user.

Lock Removal

The disclosed embodiments perform source-to-source code transformation that takes a lock-based concurrent data structure implementation as its input and generates more scalable code for the same data structure via judicious use of optimism. By striking a balance between optimism and pessimism, the common access pattern in data structure operations may be exploited. More particularly, data structure operations typically begin by traversing the data structure (to the insertion or removal point), and then perform updates to the data structure at that location. The period during which the data structure is read or traversed may be referred to as a read-only phase of an operation (e.g., transaction or function), while the updating of the data structure may be referred to as an update phase of the operation. In other words, writes or other modifications to data are not performed during the read-only phase. The read-only phase may also be referred to as a read-only prefix.

As will be described in further detail below, the code transformation may replace locking steps in the initial read-only phase of each operation in the code with optimistic synchronization, while the update phase employs the original lock-based synchronization. The optimistic traversal of the data structure increases concurrency and reduces bottlenecks, while the use of pessimistic updates to the data structure saves the overhead associated with speculative or deferred shared memory updates. This partially optimistic execution is compatible with the original source code. Thus, in some embodiments, operations may be re-executed pessimistically (e.g., by a copy of the original source code) when too many conflicts occur, avoiding livelocks.

Fully Automatic Parallelization

In accordance with various embodiments, source code may be automatically transformed as described herein in conjunction with automatic lock-based parallelization mechanisms. Automatic lock-based parallelization mechanisms instrument sequential source code to add fine-grained lock and unlock instructions that ensure integrity of the data in concurrent executions. By optimizing lock-based source code, an end-to-end approach to scalable parallelization of sequential code may be achieved.

Code Transformation

As will be described in further detail below, the disclosed embodiments provide a mechanism for performing a source code-to-source code transformation. Through such a transformation, code that accesses a data structure using lock-based concurrency control may be optimized.

Lock-Based Data Structure

In accordance with various embodiments, a set of operations may be invoked by clients of a data structure, potentially concurrently. More particularly, the data structure may define the set of operations. For example, the operations may include read, write, lock, and unlock. Such operations may have parameters, as well as local variables. The operations may interact via shared memory variables, which may be referred to as shared objects. A shared object may also refer to a segment of a concurrent data structure. Each shared object may support atomic read (load) and write (store) instructions. In addition, each shared object may be associated with a lock, which can be unique to the object or common to several (or even all) objects. Thus, each shared object may support atomic lock and unlock instructions.

In one embodiment, each object is associated with a unique lock. Locks are exclusive (i.e., a lock can be held by at most one thread at a time). Thus, the execution of a thread trying to acquire a lock (by a lock instruction) which is held by another thread is blocked until a time when the lock is available (i.e., is not held by any thread). It may be assumed that in the given code every (read or write) access by an operation to a shared object is performed when the executing thread holds the lock associated with that object.

Prior to code transformation, the source code may perform locking via lock and unlock instructions. In accordance with various embodiments, after transformation of the source code, the transformed code may also apply atomic tryLock and isLockedByAnother instructions. The tryLock instruction may return false if the lock is currently held by another thread; otherwise it may acquire the lock and return true. The isLockedByAnother instruction may return true if the lock is currently held by another thread.

Combining Optimism and Pessimism

Generally speaking, optimistic concurrency control is a form of lock-free synchronization, which accesses shared variables without locks in the hope that they will not be modified by others before the end of the operation (or more generally, the transaction). To verify the latter, optimistic concurrency control relies on validation, which is typically implemented using version numbers. If validation fails, the operation restarts. Optimistic execution of update operations may include performing roll-back (reverting variables to their old values) upon validation failure, or deferring writes to commit time; both approaches induce significant overhead. Therefore, speculative shared memory updates are not performed.

In accordance with various embodiments, optimistic synchronization is performed to read shared variables without locks as long as the operation does not update shared state. However, the disclosed embodiments revert to pessimistic (lock-based) synchronization where the operation writes to shared memory. More particularly, at the end of the read-only prefix of an operation, validation is performed based on version numbers associated with the shared objects in order to render redundant locks that would have been acquired and freed before the first update. This scheme is particularly suitable for performing operations on shared data structures, since the common behavior is to first traverse the data structure, and then perform modifications on the data structure.

An operation may be divided into three phases: an optimistic read-only phase, a pessimistic update phase, and a validation phase that conjoins them. The read-only phase traverses the data structure without taking any locks, while maintaining in thread-local variables sufficient information to later ensure the correctness of the traversal. The read phase is invisible to other threads, as it updates no shared variables. The update phase uses the original pessimistic (lock-based) synchronization and tracks version numbers associated with the shared variables. The validation phase bridges between the optimistic and pessimistic phases.

The validation phase may lock the objects for which a lock would have been held at this point by the original pessimistic source code, and validate the correctness of the read-only phase. This allows the update phase to run as if an execution of the original pessimistic synchronization took place. If the validation fails, the operation may restart (at the beginning of the read-only phase). To avoid livelock, a threshold on the number of restarts may be established. In one embodiment, if the threshold is exceeded, execution of the source code falls back on pessimistic execution, and the operation restarts (at the beginning of the read-only phase of the operation). As discussed above, during pessimistic execution, locks are taken during the read-only phase, as well as the update phase.

Phase Transition

In many cases, the transition from the read-only phase to the update phase in the original source code occurs at a statically-defined code location. For example, many data structure operations begin with a read-only traversal to locate the data of interest, and when it is found, proceed to execute code that modifies the data structure. In accordance with various embodiments, it is possible to switch from the optimistic read-only phase (via the validation phase) to pessimistic execution at any point before the first update of the data structure. The phase transition point can be determined dynamically at run time. To dynamically track the execution mode, a local variable or flag may be initialized (e.g., to true) to indicate that the current execution mode is the optimistic phase. In addition, the source code may be instrumented such that prior to a shared memory update, the transformed code checks the flag and, if the current execution mode is the optimistic read-only phase (e.g., the flag is set to true), the validation phase may be executed and the flag may be set (e.g., to false) to indicate that the execution mode is not the optimistic read-only phase or, alternatively, that the execution mode is the pessimistic update phase.

Transforming the Source Code

In the following example, the transformation of source code is illustrated with reference to a code snippet that adds a new element as the third node in a linked list. FIG. 2A is an example of source code on which a transformation may be implemented in accordance with various embodiments. As shown in this example, the source code may be divided into a read-only phase and an update phase, as will be described in further detail below.

FIG. 2B is an example of source code that may be generated by performing transformation of the source code of FIG. 2A. As shown in FIG. 2B, the transformed code may include three different phases: a read-only phase, a validation phase, and an update phase. While the phases of the code may be tracked using a flag as set forth above, the example shown in FIG. 2B illustrates the separate phases to simplify the illustration.

Read-Only Phase

FIG. 2C is an example transformation that may be performed for lock and unlock instructions in the read-only phase of the source code. More particularly, a lock instruction in the source code (shown in the left side of the table) may be replaced with the corresponding code (shown on the right side of the table). Similarly, an unlock instruction in the source code may be replaced with the corresponding code. In this example, S denotes the beginning of the operation (e.g., line 1 of the function).

The read-only phase of the source code may include instructions that read shared objects or otherwise traverse a shared data structure. The read-only phase of the source code does not include instructions that write to or otherwise modify shared objects. As shown in this example, during the transformation of the source code, lock and unlock instructions in the read-only phase of the source code may be replaced with tracking instructions that track objects that would have been locked by the original source code. In addition, the read-only phase may be transformed to track versions of objects that are read. Version numbers associated with the objects may be later used during the validation stage to validate the correctness of the optimistic execution of the read-only phase.

Version numbers associated with objects may be implemented by associating version numbers with locks on the objects. In one embodiment, each lock may be instrumented with an additional field, version. For example, each object may support incVersion instructions to increment the version number of the lock associated with the object and getVersion instructions to read the version number of the lock associated with the object. The version number of a lock associated with an object may be incremented each time a value of the object is updated. This may be accomplished by incrementing the version number of an object each time a lock of the object is released. More particularly, the version number may be incremented when the lock of the object is held (e.g., after the value of the object is updated and prior to release of the lock). Since each lock has its own version number, the version numbers of the locks are independent from one another, and there is no global entity managing the versions.

During the read-only phase, two different thread-local sets may be maintained: a locked set and a read set. The locked set tracks the objects that would have been locked by the end of read-only phase of the operation. The read set tracks versions of all objects read during the read-only phase of the operation. The locked set and the read set may later be accessed during the validation phase to ensure that the read-only phase and the update phase both observe a consistent view of shared memory.

In one embodiment, a lock instruction that locks object o may be replaced with code that tracks the object by adding the object to the locked set. In addition, the version of the object may be identified in the locked set. The object and its version may also be added to the read set. In one embodiment, the object and its version may be added to both the locked set and the read set. An unlock instruction that unlocks object o may be replaced with code that removes o from the locked set. An example of a transformed set of source code is shown in lines 2-12 of FIG. 2B.

Validation may be performed entirely during the validation phase. However, in some embodiments, an eager validation scheme may be performed during the read-only phase. FIG. 3 is a diagram illustrating an example eager validation scheme that may be applied during the read-only phase. More particularly, as shown in lines 5-6, if an object already exists in the read set, the current version of its lock is compared to the version of the lock in the read set. If the versions are different, the operation restarts at line 5.

In accordance with various embodiments, during the read-only phase, the transformed source code also verifies that an object is not locked by another thread prior to accessing it (e.g., reading its attributes). As shown in this example, if the object is determined to be locked by another thread (e.g., by a function isLockedByAnother), the operation restarts (e.g., at the beginning of the read-only phase) at line 8.

In the read-only phase, the executing thread is invisible to other threads. In other words, the executing thread avoids any contention on shared memory both in terms of writing to the memory and in terms of locking segments of the memory.

Validation Phase

Validation instructions that validate the read-only phase of the source code may be inserted into the source code. The validation instructions may be referred to as the validation phase of the source code. In some embodiments, the code of the validation phase may be invoked after the read-only phase and prior to the update phase. In this example, the validation instructions are inserted between the read-only phase and the update phase of the source code.

Example validation instructions are shown at lines 13-20 of FIG. 2B. As shown at lines 14-17 of FIG. 2B, the validation instructions may lock objects that are identified in the locked set. To avoid deadlocks, the locks may be acquired using a tryLock instruction. If a tryLock fails, the code may unlock all previously acquired locks and restart from the beginning of the function (at line 1).

In addition, the validation instructions may validate the objects in the read set. More particularly, version numbers may be used to validate the correctness of the optimistic execution of the read-only phase. As shown at lines 14-17 of FIG. 2B, for each object in the read set, the version of the object (or the version of its lock) may be compared to the current version of the object (or the version of its lock). If the version of an object in the read set differs from current the version, validation may be determined to fail and the operation restarts at the beginning of the read-only phase. In addition, if any of the objects are locked by another thread, the validation may fail and the operation may restart at the beginning of the read-only phase, as shown at lines 18-20 of FIG. 2B. Therefore, if validation fails, execution of the operation may be restarted (e.g., at the beginning of the read-only phase).

As shown at lines 18-20 of FIG. 2B, validation of the objects in the read set may be performed by a validateReadSet function. An example validateReadSet function that may validate the objects in the read set is shown in FIG. 4. In this example, the function validateReadSet may determine whether an object in the read set has been updated by comparing the current version of an object (or its lock) with the version of the object (or its lock) identified in the read set, as described above. In this example, the function validateReadSet returns true if all of the objects in the read set have not been updated, and otherwise returns false.

The validateReadSet function may also check that each object in the read set is not locked by another thread. This check guarantees that the object was not locked from the time it was read until the time it was validated. Since operations write only to locked objects, it follows that an object that was not locked during this time was not changed. If any of the objects in the read set is locked by another thread (e.g., by a function isLockedByAnother), the function validateReadSet returns false, and otherwise returns true.

In accordance with various embodiments, a memory fence is imposed by the function isLockedByAnother that determines whether an object is locked by another thread. This ensures that the read of an object's lock and version is performed before the object's value is read during the read-only phase. Similarly, a read fence may be imposed prior to the validation phase to ensure that the second read of the object's lock and version during the validation phase is performed after the optimistic read of the object's value, as shown at line 13 of FIG. 2B.

Update Phase

The update phase may include a segment of the original source code that modifies a shared data structure (e.g., shared objects). In the example shown in FIGS. 2A and 2B, a third node is added to a linked list that includes two nodes.

During the transformation, update instructions are inserted into the update phase of the source code, where the update instructions increment the version of an object (e.g., the version of the lock of the object) each time a value of the object is updated. In accordance with various embodiments, this may be accomplished by incrementing the version each time the object is unlocked. For example, as shown in lines 21-29 of FIG. 2B, before each unlock instruction, the version of the object that has been locked may be incremented.

Exceptions from Regular Flow

During the read-only phase, an inconsistent state of shared memory may be observed. To avoid infinite loops that might occur due to inconsistent reads during the read-only phase, a timeout may be set. If the timeout expires before the read-only phase is completed, read set validation may be performed (e.g., by invoking the function validateReadSet shown in FIG. 4). If the validation fails, execution of the function may be restarted at the beginning of the read-only phase. This may be accomplished by inserting code that examines the timeout.

Similarly, inconsistent views of shared memory may lead to spurious exceptions in the read-only phase. Thus, all exceptions may be caught, and validation may be performed (e.g., by invoking the function validateReadSet) by an exception handler. If the validation fails, execution of the source code may be restarted at the beginning of the read-only phase.

By performing an automated source code transformation as described herein, the shared state at the end of the validation phase is identical to the state that would have been reached had the code been executed pessimistically from the outset. As a result, the three-phase version of the code is compatible with the original pessimistic version of the source code.

In accordance with various embodiments, two different versions of source code are maintained. More particularly, a pessimistic version of the source code may be maintained in addition to the instrumented source code resulting from performing the disclosed transformations on the original source code. For example, a copy of the pessimistic source code may be concatenated (e.g., appended) to the source code prior to performing the transformation. Thus, if the optimistic read-only phase of the transformed source code is unsuccessful, the pessimistic source code may be automatically executed. Moreover, at any point during execution of the read-only phase of the transformed source code, it is possible to automatically switch to the pessimistic version of the source code.

In accordance with various embodiments, the pessimistic source code that is maintained may be generated by inserting instructions for updating versions of objects into the original source code. An example of such instructions is shown and described above with reference to FIG. 2B. In other embodiments, the pessimistic source code may include a copy of the original source code. Therefore, the two different versions of the source code that are maintained may include the optimistic transformed source code and a pessimistic version of the source code.

It may be desirable to automatically switch from executing the transformed source code to the pessimistic version of the source code (or operation(s) implemented by the source code) under two circumstances. First, livelocks may be avoided by limiting the number of restarts due to conflicts. More particularly, the validation phase may track the number of restarts in a thread-local variable. If the number of restarts that have been performed (and therefore the number of times that the optimistic read-only phase has been executed) exceeds a particular threshold, execution of the transformed code may be discontinued and the pessimistic source code may be executed from the beginning of the source code.

Second, if execution of the optimistic transformed source code fails or it becomes impossible to continue executing the transformed source code, the pessimistic source code may be executed. More particularly, where it becomes impossible to continue executing the optimistic read-only phase of the transformed source code, the validation phase may be executed. If the validation fails, the pessimistic source code may be executed from the beginning of the operation. However, if the validation is successful, the pessimistic source code may be executed from the same point that execution of the optimistic source code failed or became impossible.

In one embodiment, the locked set and read set are implemented using statically defined arrays having a constant size. If either of the arrays becomes full and it is impossible to proceed with executing the read-only phase of the transformed optimistic source code, the validation phase may be performed. If validation is successful, the pessimistic source code may be executed from the same point in the read-only phase at which execution of the transformed source code ceased. However, if validation is unsuccessful, the pessimistic source code may be executed from the beginning of the operation.

Figure 5:
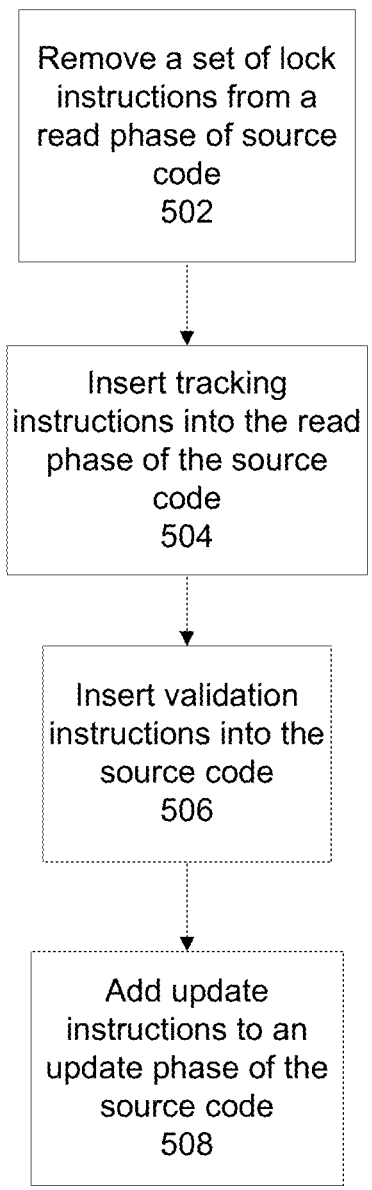
FIG. 5 is a process flow diagram illustrating an example method of instrumenting source code in accordance with various embodiments.

FIG. 5 is a process flow diagram illustrating an example method of instrumenting source code by a code transformer in accordance with various embodiments. In some embodiments, the code transformer may identify a read-only phase and an update phase within the source code prior to or during source code instrumentation. The code transformer may remove a set of lock and unlock instructions from a read phase of source code at 502. As described above, the set of lock and unlock instructions may correspond to traversal or reading of a concurrent data structure.

The code transformer may insert tracking instructions into the read phase of the source code at 504. More particularly, the tracking instructions may include a first set of tracking instructions that track a set of locked objects, where the set of locked objects identify objects that would have been locked by executing the set of lock and unlock instructions. More particularly, a lock instruction that locks an object may be replaced with an instruction that adds the object to a set of locked objects. Similarly, an unlock instruction that locks the object may be replaced with an instruction that removes the object from the set of locked objects. The lock and unlock instructions within an update phase of the source code are not eliminated. In addition, the tracking instructions may include a second set of tracking instructions, where the second set of tracking instructions track a set of read objects indicating versions of objects that are read (e.g., during the read-only phase).

The code transformer may insert validation instructions into the source code at 506. The validation instructions may be inserted such that, when the source code is later executed, the validation instructions are executed after the read phase and prior to the update phase. The validation instructions may perform validation based, at least in part, on a result of executing the tracking instructions, as will be described in further detail below. The validation instructions may validate the read phase of the source code. More particularly, the validation instructions may validate that the versions of objects in the set of read objects have not changed since they were last read. Validating that the versions of objects in the set of read objects have not changed since they were last read may include determining, for each object in the read set, whether a current version of the object is identical to the version of the object in the read set. In addition, the validation instructions may lock objects that remain in the set of locked objects upon completing execution of the read-only phase and corresponding tracking instructions.

The validation instructions may restart execution of an operation (e.g., function) implemented by the source code (e.g., at the beginning of the read phase) upon failure of the validation. More particularly, validation may be determined to have failed if any of the objects in the set of read objects have changed since they were last read. To avoid infinite loops, the validation instructions may limit the number of times execution of the operation is restarted such that a pessimistic version or an unmodified version of the operation (e.g., corresponding to the original source code) may be executed upon determining that the number of times execution has been restarted has reached a particular threshold.

The code transformer may add update instructions to an update phase of the source code such that locks on the concurrent data structure are tracked. More particularly, the code transformer may add update instructions to an update phase of the source code at 508 such that versions of objects are maintained (e.g., tracked). In one embodiment, a current version of an object is incremented after a value of the object is updated. For example, the current version of an object may be incremented each time a lock of the object is released (e.g., after the value of the object is updated and prior to release of the lock). Update instructions are not added to the read-only phase of the source code.

The source code may include one or more operations. For example, the source code may include one or more functions. Accordingly, code transformation may be performed for each of the functions, resulting in corresponding read-only, validation, and update phases for each of the functions.

In one embodiment, the process shown in FIG. 5 may be performed during compilation of the source code. In other embodiments, the process may be performed upon initiating of the process automatically by a system component or in response to user initiation.

Network Architecture

Figure 6:
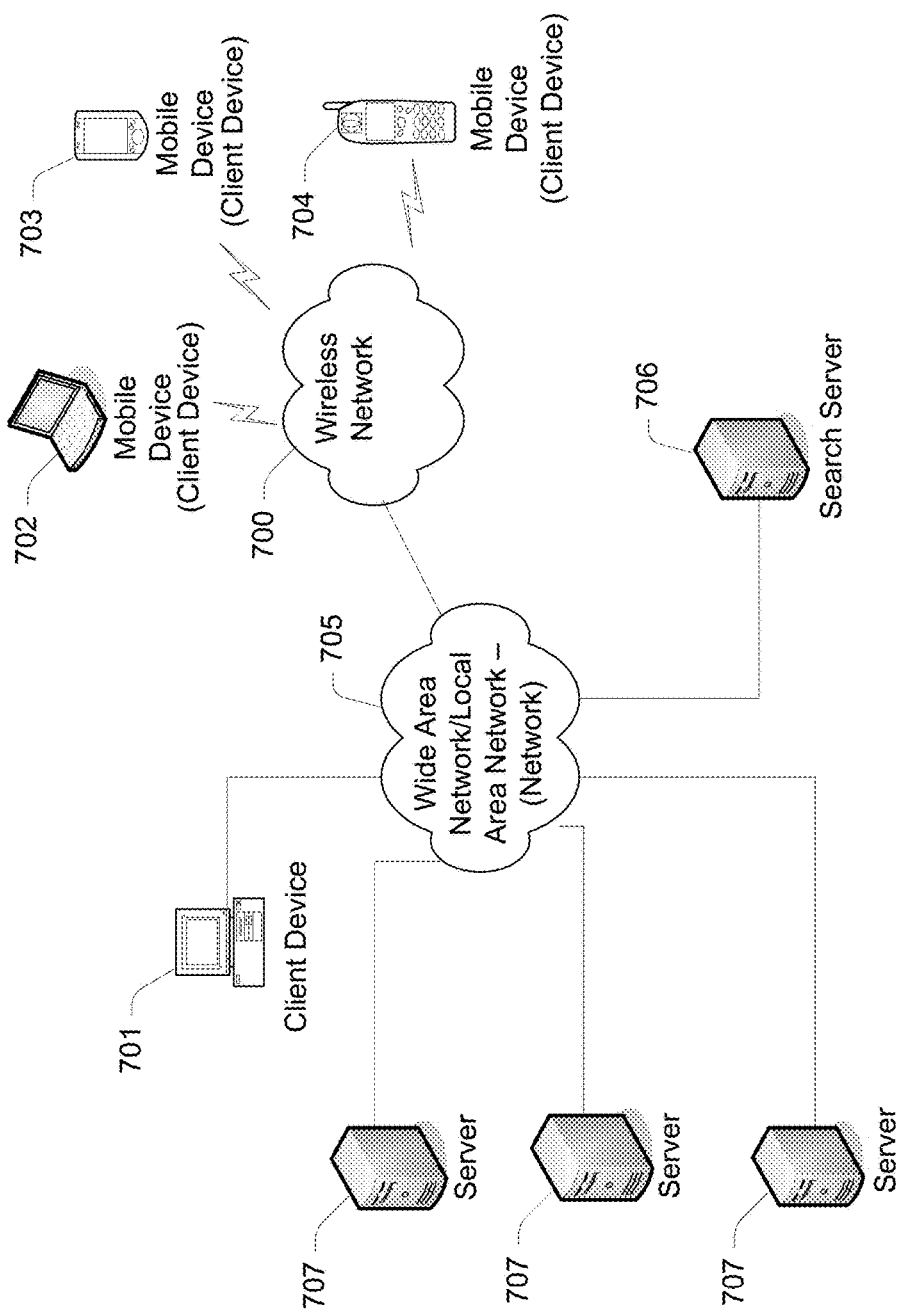
FIG. 6 is a schematic diagram illustrating an example embodiment of a network in which various embodiments may be implemented.

The disclosed embodiments may be implemented in any of a wide variety of computing contexts. FIG. 6 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 4, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 6 by server(s) 707, which may correspond to multiple distributed devices and data store(s). The server(s) 707 and/or corresponding data store(s) may store user account data, user information, and/or content.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Figure 7:
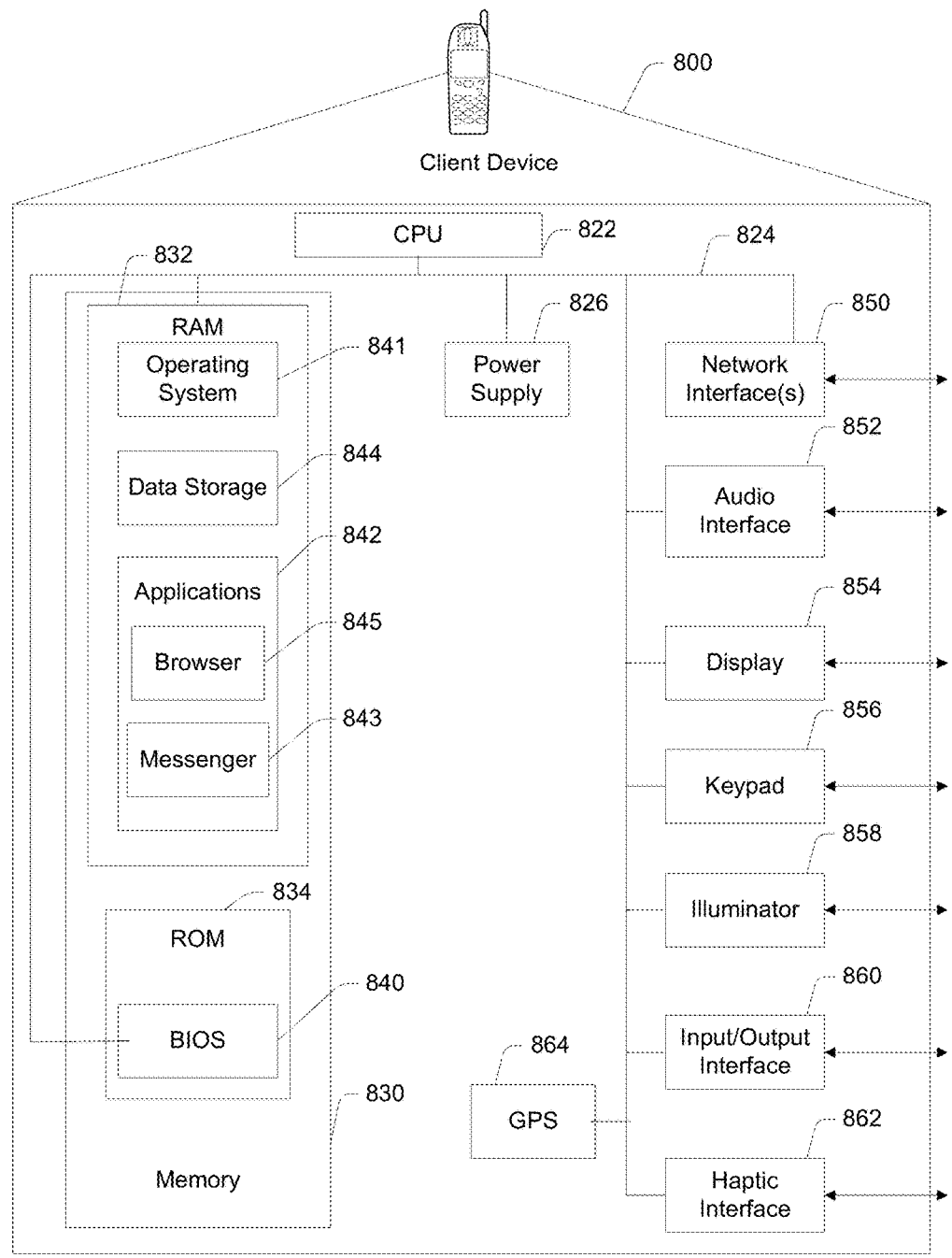
FIG. 7 is a schematic diagram illustrating an example client device in which various embodiments may be implemented.

In some embodiments, transformation of source code may be initiated by a user operating a client device. FIG. 7 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print.

Figure 8:
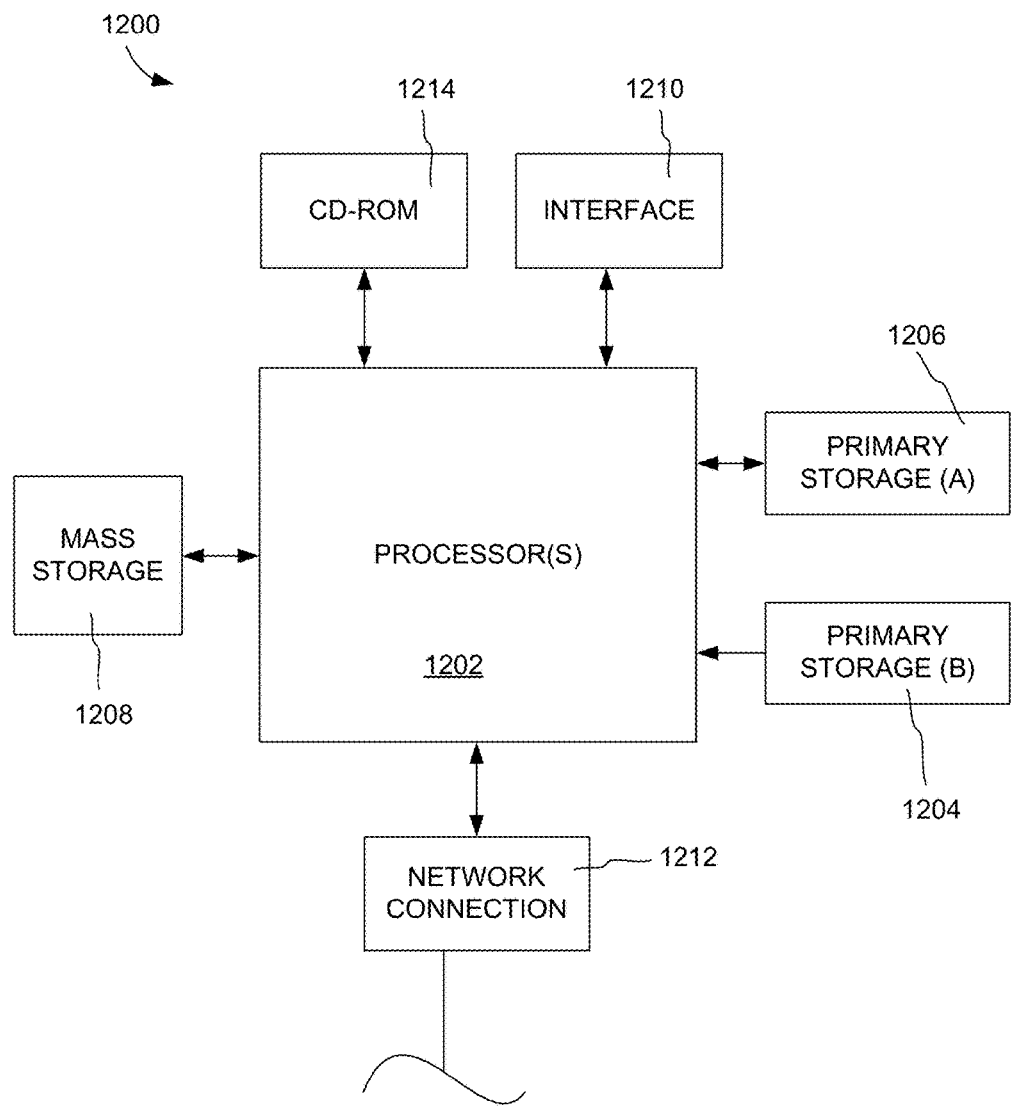
FIG. 8 is a schematic diagram illustrating an example computer system in which various embodiments may be implemented.

FIG. 8 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
  replacing, by a processor, a set of lock and unlock instructions in a read phase of source code with a first set of tracking instructions, wherein the first set of tracking instructions track a set of locked objects identifying objects that would have been locked by executing the set of lock and unlock instructions;
  inserting, by a processor, a second set of tracking instructions into the read phase of the source code, wherein the second set of tracking instructions track a set of read objects indicating versions of objects that are read;
  inserting, by a processor, validation instructions into the source code, wherein the validation instructions lock objects in the set of locked objects and validate that the versions of objects in the set of read objects have not changed since they were last read; and
  adding, by a processor, update instructions to an update phase of the source code, wherein the update instructions increment a current version of an object each time a value of the object is updated or a lock of the object is released.

2. The method as recited in claim 1, wherein replacing the set of lock and unlock instructions comprises:
  for each lock instruction in the read phase of the source code, inserting an instruction that adds the object to the set of locked objects; and
  for each unlock instruction in the read phase of the source code, inserting an instruction that removes the object from the set of locked objects.

3. The method as recited in claim 1, wherein validating that the versions of objects in the set of read objects have not changed since they were last read comprises determining, for each object in the read set, whether the current version of the object is identical to the version of the object in the read set.

4. The method as recited in claim 1, wherein the validation instructions restart execution of an operation of the source code at a beginning of the read phase upon failure of the validation.

5. The method as recited in claim 4, wherein the validation instructions limit the number of times execution of the operation is restarted such that an unmodified version of the operation is executed upon determining that the number of times execution has been restarted has reached a particular threshold.

6. The method as recited in claim 1, wherein the validation instructions determine, for each object in the set of read objects, whether another thread has locked the object.

7. The method as recited in claim 1, further comprising:
  cloning the source code such that an unmodified version of the source code is maintained, wherein cloning the source code is performed prior to replacing the set of lock and unlock instructions with the first set of tracking instructions, inserting the second set of tracking instructions, inserting the validation instructions, and adding the update instructions.

8. A non-transitory computer-readable storage medium storing thereon computer-readable instructions, comprising:
  instructions for removing a set of lock and unlock instructions from a read phase of source code;
  instructions for inserting tracking instructions into the read phase of the source code, wherein the tracking instructions track a set of read objects indicating versions of objects that are read;
  instructions for inserting validation instructions into the source code, wherein the validation instructions validate that the versions of objects in the set of read objects have not changed since they were last read; and
  instructions for adding update instructions to an update phase of the source code, wherein the update instructions increment a version of an object each time a value of the object is updated or a lock of the object is released.

9. The non-transitory computer-readable storage medium as recited in claim 8, wherein the validation instructions are inserted into the source code such that the validation instructions are executed after the read phase of the source code.

10. The non-transitory computer-readable storage medium as recited in claim 8, wherein upon failure of the validation, execution of an operation of the source code is restarted.

11. The non-transitory computer-readable storage medium as recited in claim 10, wherein the validation instructions limit the number of times execution of the operation is restarted such that an unmodified version of the operation of the source code is executed upon determining that the number of times execution has been restarted has reached a particular threshold.

12. The non-transitory computer-readable storage medium as recited in claim 8, wherein the tracking instructions further maintain a set of locked objects identifying objects that would have been locked by executing the set of lock and unlock instructions;

wherein the validation instructions lock objects identified in the set of locked objects after execution of the tracking instructions.

13. The non-transitory computer-readable storage medium as recited in claim 8, wherein the validation instructions determine, for each object in the set of read objects, whether another thread has locked the object.

14. The non-transitory computer-readable storage medium as recited in claim 8, further comprising;

inserting switching instructions into the source code, wherein the switching instructions switch execution to a pessimistic lock-based version of the source code upon detection of a failure during execution of the source code.

15. An apparatus, comprising:

a processor; and a memory, at least one of the processor or the memory being configured to:

remove a set of lock and unlock instructions from a read phase of source code;

insert tracking instructions into the read phase of the source code, wherein the tracking instructions track a set of read objects indicating versions of objects that are read;

insert validation instructions into the source code, wherein the validation instructions validate that the versions of objects in the set of read objects have not changed since they were last read; and add update instructions to an update phase of the source code, wherein the update instructions increment a current version of an object each time a value of the object is updated or a lock of the object is released.

16. The apparatus as recited in claim 15, wherein the tracking instructions further track a set of locked objects identifying objects that would have been locked by executing the set of lock and unlock instructions;

wherein the validation instructions lock objects remaining in the set of locked objects.

17. The apparatus as recited in claim 15, wherein the validation instructions are further configured to determine whether another thread has locked any objects in the set of read objects.

18. The apparatus as recited in claim 15, wherein the validation instructions determine whether the version of any objects in the set of read objects have changed since they were last read by ascertaining, for each object in the read set, whether the current version of the object is identical to the version of the object in the read set.

19. The apparatus as recited in claim 15, wherein the validation instructions restart execution of an operation of the source code at a beginning of the read phase upon failure of the validation.

20. The apparatus as recited in claim 19, wherein the validation instructions limit the number of times execution of the operation is restarted such that an unmodified version of the operation is executed upon determining that the number of times execution has been restarted has reached a particular threshold.

21. The method as recited in claim 1, wherein replacing the set of lock and unlock instructions, inserting the second set of tracking instructions, inserting the validation instructions, and adding the update instructions are performed by a compiler.

* * * * *